United States Patent

Sidline

[15] 3,681,523

[45] Aug. 1, 1972

[54] TRANSPORT CONTROLLER

[72] Inventor: George B. Sidline, Belmont, Calif.

[73] Assignee: Ampex Corporation, Redwood City, Calif.

[22] Filed: Aug. 13, 1970

[21] Appl. No.: 63,478

[52] U.S. Cl.......178/6.6 A, 179/100.2 B, 235/92 CC

[51] Int. Cl............................G11b 27/32, G06f 7/48

[58] Field of Search....178/6.6 A; 179/100.2 B, 100.2 S; 235/92 CC, 92 PE

[56] References Cited

UNITED STATES PATENTS

| | | | |
|---|---|---|---|
| 3,271,730 | 9/1966 | Stedtnitz | 235/92 CC |
| 3,535,467 | 10/1970 | Thieme et al | 179/100.2 B |

*Primary Examiner*—J. Russell Goudeau
*Attorney*—Robert G. Clay

[57] ABSTRACT

The actual length a magnetic tape must be transported to position a particular storage address at a certain point is compared to a reference indicative of tape length decreasing at a known rate. Enabling and disabling signals are provided in response to the comparison; the enabling signal being provided when the actual and reference lengths are the same and the disabling signals when they are different. Two counters are coupled to receive the enabling and disabling signals and are associated with each other to provide an output signal when the actual tape length and reference tape length are equal for a predetermined interval and inhibit the provision of the output signal when they are not equal for the predetermined interval.

8 Claims, 1 Drawing Figure

PATENTED AUG 1 1972 3,681,523
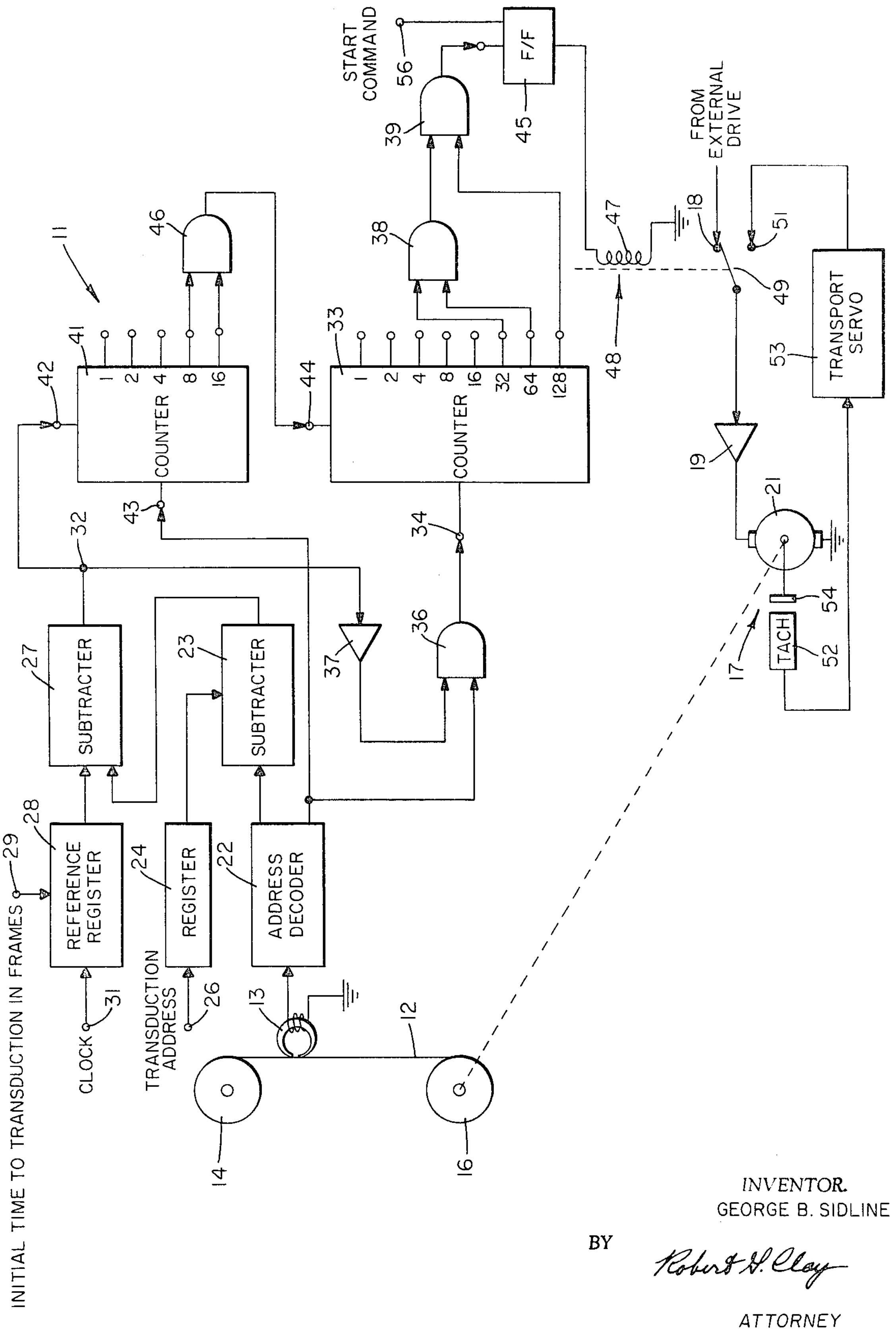
INVENTOR.
GEORGE B. SIDLINE
BY Robert G. Clay
ATTORNEY

TRANSPORT CONTROLLER

FIELD OF THE INVENTION

The present invention relates to detecting the occurrence of an event and, more particularly, to detecting the occurrence of an event for effecting the control of the transport of an object.

BACKGROUND OF INVENTION

Operations performed to achieve a desired result as, for example, by automatically operated equipment or during the conduction of processes, often involve completing a series of functions, generally, in an organized sequence. In many of these cases, the performance of certain ones of the sequence of functions depends upon the occurrence of a particular event determined by a condition lasting a predetermined duration. For example, to record signals on or reproduce signals from magnetic record media, the mechanisms used to transport the record media are operated to position a particular location on the record media at the location of the magnetic head transducers employed to record or reproduce the signals at an exact instant. Frequently, this instant is determined by the occurrence of other events such as, for example, the performance of recording and reproducing operations with other sources. In such cases, the positioning of the particular location on the record medium must be synchronized to the occurrence of such other events. To accomplish such synchronization, the transport of the record medium is controlled in accordance with a reference indicative of the duration of the other events so that the particular location on the record medium arrives at the magnetic head transducers at the desired instant. When a magnetic tape record medium is being transported to position a particular location thereon for transduction operations, this synchronization is achieved by varying the speed at which the tape is transported until, at a selected tape speed (usually the speed at which transduction operations are performed), the distance the particular location on the tape must be transported to be positioned at the magnetic head transducer is such that the particular location will arrive at the position of the transducer at the desired instant. Once the desired synchronization is achieved, the speed of the tape can be maintained at the selected speed.

Heretofore, the achievement of the desired synchronization has been indicated by detecting with one circuit the distance the particular location must be transported to position it at the magnetic head transducer and providing an indication of the condition when this distance corresponds to that which, if the tape is transported at the selected speed for performing transduction operations, would position the particular location at the transducer at the desired instant. With another circuit, the actual tape speed is detected. If the tape speed is at or close to the transduction speed, the condition will remain permanent, which is the event of interest. If the tape speed is substantially different from the transduction speed, the incident will be short lived. A coincidence circuit usually is employed to operate with the two detection circuits to provide an indication when the desired event occurs.

While these prior art event detectors perform the function of indicating the occurrence of events, considerable advantage is to be gained by simplifying and minimizing the number of components required to construct such event detectors. Furthermore, additional advantages will be realized if a single circuit can be employed to detect the occurrence and duration of a condition determining the characteristic of the transportation of an object.

Accordingly, it is an object of this invention to simplify the detection of the occurrence and duration of a condition determining the characteristic of the transportation of an object.

More particularly, it is an object of this invention to provide a single circuit for detecting and providing a responsive indication when a particular discrete storage location of a transported magnetic record medium is a distance from a particular location which, at the speed the record medium is being transported, will arrive at the particular location at a desired instant.

Another object of the present invention is to provide a digital technique of detecting the occurrence and duration of a condition determining the characteristic of the transportation of an object.

In accordance with the present invention, a first counter is coupled to receive a timing signal which steps its count when the distance an object must be transported to be positioned at a certain location equals the distance represented by a reference which decreases at a known rate. The counter is set to provide an indication when its count reaches a predetermined number indicative of the distances remaining equal for a desired duration. A second counter is coupled to receive the timing signal to step its count during periods when the distances are not equal. The second counter is coupled to reset the first counter to zero when the count in the second counter reaches a predetermined number. Each time the distances become equal, the count in the second counter is reset to zero. In some cases, an event takes place over a number of interrupted intervals with the periods of the interruptions being periods of nonoccurrence of the condition. Such events are considered to have occurred if each of the periods of interruption is less than a selected duration. The count in the second counter chosen to effect the resetting of the count in the first counter is selected in accordance with this allowable duration of nonoccurrence of the condition, i.e., duration the object and reference distances are not equal, which may be included in the total time interval over which the event occurs, i.e., the object and reference distances are equal. An example of such a case will be described hereinbelow with reference to the specific embodiment of the present invention as employed in a magnetic video tape transport mechanism.

BRIEF DESCRIPTION OF THE DRAWING

The foregoing and other advantages and features of the present invention will become more apparent from the following description and claims considered together with the single Figure which is a schematic block diagram of the present invention as employed to control the application of motor drive signals to a magnetic tape transport mechanism.

DESCRIPTION OF THE PREFERRED EMBODIMENT

Referring to the single Figure, the transport controller 11 of the present invention is a type of event detector and is illustrated as employed to indicate when a magnetic video tape 12, being transported at a certain desired speed, has a particular one of its storage locations or frames located a certain distance relative to the position of, for example, a magnetic head transducer 13 for reproducing address signals so that the frame will arrive at a desired position relative to the address head 13 at a desired instant. In performing recording or reproducing operations sequentially with different video signals sources, as record or reproduce operations are performed with one source, the second source, for example, video tape 12, is readied for transduction operations so that a transition from one source to the other can be effected without an interruption of the transduction operations. In such cases, the transport of the tape 12 between a supply reel 14 and a take-up reel 16 is controlled in accordance with the transduction operations currently in progress with the other video signal source. A controller (not shown) provides external drive signals to the transport mechanism 17 of the tape 12 at the input terminal 18. These external drive signals commonly are obtained by determining the time remaining until the transduction operations are to be performed with the tape 12 and the length of tape 12 required to be transported to position a desired one of its frames at the magnetic head transducer the instant transduction operations with tape 12 are to be initiated. From this determined information, external drive signals are obtained to command the motor drive amplifier 19 and transport motor 21 to advance the tape 12 at a speed which will place the desired frame at the head the instant that transduction operations are to be initiated with tape 12.

In preparation of performing transduction operations, the proper transport of the tape 12 relative to the magnetic head transducers must be set to establish the required precise head-to-tape position and speed relationships. Generally, the relative head-to-tape speed is controlled in accordance with a reference signal, commonly, the studio synchronizing signal. However, as previously described, when tape 12 is transported to position a particular one of its frames in a transductional relationship with a magnetic head transducer at a precise instant relative to the transduction operations being performed with another video signal source, the speed of tape 12 is controlled in accordance with the distance the tape 12 must be transported to position the particular one of its frames and the time remaining to the instant transduction operations are to be initiated with the tape 12. Nevertheless, since the transduction operations conducted with the other video signal source will also be controlled in accordance with the studio synchronizing signal, control of the transport of the tape 12 can be released to the studio synchronizing signal upon the occurrence of the event of the particular frame of the tape at which the transduction operations are to be initiated being a distance away from the location of the magnetic head transducer while the tape 12 is being transported at the transduction speed which would position the particular frame at the transducer location the precise instant the transduction operation is to be initiated with tape 12 if the transport of the tape 12 is continued at the required transduction speed.

The transport controller or event detector 11 of the present invention is a digital device which, in response to information related to the length of the tape 12 being transported and, preferably, recorded along the tape 12, provides an indication of the aforedescribed event. In the illustrated embodiment, the event detector 11 is arranged to be responsive to address signals recorded along the tape 12 in a binary format as recorded states of magnetization with one of the binary digits represented by one state of magnetization and the other binary digit by another different state of magnetization. The frames of tape 12 are consecutively addressed by a sequence of address signals recorded in the binary code format along a longitudinal track of the tape. Since successive frames are consecutively addressed and all of the frames are of a uniform size, the distance separating any two frames of the tape 12 can be determined by the examination of a single frame address. As the tape 12 is transported to position the particular frame at the desired location for transduction of signals, the address signals are reproduced by the reproduce magnetic head transducer 13 and are coupled to the input of an address decoder 22. In most magnetic recorder/reproducer systems, the address head 13 is located a known and exact distance from the location of the magnetic head transducers for recording video signals on or reproducing the signals from the tape 12. Consequently, the address signals identifying the frames of the tape 12 are offset from the location of the frames on the tape 12 so that, when an address signal is being reproduced by the address head 13, the frame it identifies is at the location of the head for transduction of the video signals.

The address decoder 22 operates to convert the reproduced address signals to a binary signal in pulse form suitable for further processing by common binary logic devices. The binary address pulse signal output by the address decoder is coupled to one input of a first binary subtracter 23. The first subtracter 23 also receives at its second input the binary address pulse signal of the particular frame of tape 12 to be positioned for transduction. This binary address signal is provided from a storage register 24 which has the binary address signal set therein prior to initiating operations by a common encoding device (not shown), such as a thumb wheel, keyboard, etc., connected at its input terminal 26. The subtracter 23 performs a subtraction of the input binary address pulse signals and issues an output binary difference number in pulse form representative of the number of frames, hence, the actual length of tape 12 which must be transported to position the particular frame at the desired location for transduction of signals.

As discussed hereinbefore, the condition of interest is the particular frame of tape 12 being located a distance, as represented by a number of frames, from the location for transduction of signals which would position the particular frame at the transduction location at the instant transduction operations are to be initiated with tape 12 if the tape is transported at the required transduction speed. To indicate when this condition occurs, the binary difference number output by the first subtracter 23 is compared to a reference signal representative of the time remaining to the instant it is desired to initiate transduction operations with tape 12. This reference signal is a binary pulse signal representing a number of frames and is counted down from an initial number at a known rate corresponding to the tape speed at which transduction operations are to be performed with tape 12. Hence, when the binary difference number output by the first subtracter 23 equals the number of frames represented by the reference signal, the desired condition occurs. The comparison is performed by a second binary subtracter 27 which has its first and second inputs coupled to receive the outputs provided by the first subtracter 23 and reference register 28, respectively. The occurrence of the condition is indicated by a zero binary difference number output by the second subtracter 27.

The initial reference number of frames stored in the reference register 28 may be set into the register 28 at the input terminal 29 either manually by a common encoding device of the type previously mentioned or may be provided by the other video signal source as a number of frames to the completion of its transduction operations. The initial reference number of frames set into the register 28 represents the length of tape 12 which would be transported during the time to the instant transduction operations are to be initiated with tape 12 if the speed of tape 12 was maintained at the transduction speed.

In operation, as tape 12 is transported to position its particular frame for transduction operations, a timing signal or clock is coupled to the clock input terminal 31 of the reference register 28. These clock signals cause the binary reference number stored in the reference register 28 to be decreased at the rate corresponding to the required transduction speed of tape 12. For example, if the tape 12 is transported at a speed of 30 frames per second, the clock signal provided to the reference register 28 would be arranged to decrease the binary reference number stored therein at a rate of 30 frame numbers per second. Furthermore, as discussed above, the speed of tape 12 is being adjusted in accordance with the distance tape 12 must be transported to position the particular frame at the location at which transduction operations are performed the instant they are to be performed. While tape 12 is being so transported, the binary difference number output by the first subtracter 23 decreases as the particular frame of tape 12 is transported closer to the transduction location and the binary reference number stored in the reference register 28 is counted down by the clock signal. During this time, the second subtracter 27 performs a subtraction of the binary signals received from the reference register 28 and first subtracter 23. When the binary difference number provided by the first subtracter 23 is the same as the binary reference number stored in the register 28, the second subtracter 27 issues a zero binary difference number at its output 32 indicative of the occurrence of the condition of interest.

While the binary reference number stored in the reference register 28 is counted down at a fixed, known rate, the binary difference number output by the first subtracter 23 does not decrease at any particular rate. Instead, it varies as the transport speed of tape 12 is varied in response to the changes in the external drive signals provided at input terminal 18. If the particular frame of tape 12 is initially too far from the transduction location to be positioned there at the desired instant if the tape 12 is transported at transduction speed, the drive signals provided at the input terminal 18 initially cause the transport mechanism 17 to advance tape 12 at a speed greater than the transduction speed. Hence, the binary difference number provided by the first subtracter 23 will be decreased at a rate greater than that of the binary reference number provided by the reference register 28. However, if the particular frame of tape 12 is initially too close to the transduction location whereby it would be transported beyond the transduction location if the tape 12 is transported at transduction speed, the drive signals initially cause tape 12 to be advanced at a speed less than the transduction speed. In this case, the binary difference number provided by the first subtracter 23 will decrease at a rate less than that of the binary reference number provided by the reference register 28.

Therefore, although the second subtracter 27 may issue a zero binary difference number indicative of the occurrence of the condition of interest, the speed of the tape 12 at this instant may be considerably greater or less than the transduction speed. Because of the inertia of the tape transport system, the speed of the tape 12 cannot be instantaneously changed. Hence, in such cases the condition would last only momentarily and the binary signals provided by the first subtracter 23 and the reference register 28 would immediately become different since the rates at which they change would be different. This would occur even if the transport mechanism 17 was released to internal control immediately upon the occurrence of the condition. Consequently, while the desired condition may occur, it may be a condition not determinative of the desired event, i.e., of the particular frame of tape 12 being at a distance from the transduction location while the tape is being transported at or close to the transduction speed which would result in the particular frame arriving at the transduction location the instant transduction operations are intended to start if the transport of the tape 12 is maintained at the transduction speed.

Thus, the occurrence of the event is not only determined by the happening of the condition as indicated by a zero binary signal output by the second subtracter 27 but also by the speed of the tape 12 when the condition is indicated to have occurred. Since the duration of the condition depends upon the speed of the tape 12 relative to the rate at which the binary reference number stored in the reference register 28 is counted down, the speed of the tape 12 can be determined by examining the duration the second subtracter 27 provides a zero binary difference number. To detect the duration of this zero state of the second subtracter 27, a binary counter 33 is provided having clock input terminal 34 coupled to receive a signal indicative of the speed at which the tape 12 is transported when the second subtracter 27 provides a zero binary difference number. More particularly, the binary coded address signals commonly recorded along tapes include clock information, which is proportional to the speed of tapes on which the address signals are recorded. In decoding the reproduced address signals, address decoders use the clock information, usually, in the form of a train of pulses, to synchronize the operation of the decoders to the speed of the tape from which the address signals are reproduced. The event detector 11 of the present invention uses the clock signal to determine the duration of the condition of interest. An "AND" gate 36 has one of its inputs coupled to receive the clock pulses from the address decoder 22. The other input of the "AND" gate 36 is coupled through an inverter 37 to the output 32 of the second binary subtracter 27 to receive an indication of the binary store of subtracter 27. The subtracter 27 is arranged to provide a first inhibiting signal level when its binary state is other than that corresponding to a zero binary difference number and a second enabling signal level when it corresponds to a zero binary difference number. Hence, when the binary difference number in the second binary subtracter 27 is zero, the enabling signal level is coupled to the input of the "AND" gate 32 to condition it to pass the clock pulses from the address decoder 22 to the clock input terminal 34 of the counter 33.

Each clock pulse input to the counter 33 advances the counter's count one number. The counter 33 is arranged to issue on output signal indicative of the occurrence of an event when its count reaches a predetermined number. The predetermined number is selected in accordance with the number of clock pulses reproduced per unit length of tape 12 and the transduction speed of tape 12 to indicate when the speed of tape 12 is approximately at the transduction speed during the occurrence of the condition of interest. For example, for 75 clock pulse per frame and a transduction speed of 30 frames per second, the counter 33 is arranged to issue an output signal when its count reaches 224 or about three times the number of clock pulses provided for each frame of the tape 12. In the illustrated embodiment, the binary stages "32" and "64" of the counter 33 are coupled to a first "AND" gate 38. The output of the "AND" gate 38 extends to one input of a second "AND" gate 39 which also has a second input coupled to the binary stage "128" of the counter 33. The first "AND" gate 38 is enabled when both binary stages "32" and "64" are active indicating counter 33 has counted at least 96 clock pulses received from the address decoder 22. As long as the binary stages "32" and "64" remain active, the "AND" gate 38 provides an enabling input to the second "AND" gate 39. Therefore, when the binary stage "128"is active at the same time as stages "32" and "96,"indicating counter 33 has counted at least 224 clock pulses from the address decoder 32, the "AND" gate 39 is enabled and issues an output signal representative of the condition lasting for a duration of at least about 0.1 second. In order for the condition to last for this duration, the tape 12 must be at a speed closely equal to the desired transduction speed.

While the speed of tape 12 may be equal to the transduction speed when the condition occurs, the binary reference number stored in the reference register 28 may not change at the same instant as the binary difference number changes in the first subtracter 23, i.e., while both change at or very close to the same rate these changes are not coincident. In such instances, the binary state of the second subtracter 27 will not be zero continuously for the required duration. However, if the binary reference number and binary difference number are the same for a greater part of the time required to transport a single frame past the address head 13, the transport of the tape 12 can be released to internal control and the framing synchronization electronic systems associated with standard magnetic tape transport mechanisms 17 will adjust the transport of the tape 12 so that the frames pass the address head 13 in the proper time relation to the studio synchronizing signal. To provide an indication when the condition occurs at a tape speed other than the transduction speed or when the frame of tape 12 is not properly positioned relative to the studio synchronizing signal, a second binary counter 41 is provided to indicate the interval the binary difference number and binary reference number are not the same, i.e., the duration the binary state of the second subtracter 27 is other than that corresponding to zero. The second counter 41 has a reset terminal 42 coupled to the output terminal 32 of the second subtracter 27. The enabling signal level output by the subtracter 27 (corresponding to a binary state of zero) resets the counter 41 to zero. When the subtracter 27 issues an inhibiting signal (corresponding to a binary state other than zero), the counter 41 is permitted to accumulate counts.

The counter 41 indicates the non-occurrence of the condition or a condition lasting for less than the required duration by counting clock pulses provided by the address decoder 22 at its clock input terminal 43. Each clock pulse input to the counter 41 advances its count one number. When its count reaches a predetermined number, the counter 41 issues an output signal which is coupled to the reset terminal 44 of the first counter 33. The output signal provided by counter 41 resets the counter 33 to zero thereby preventing its count from reaching the count 224 indicative of the occurrence of the condition for the required duration or the occurrence of the event. In the illustrated embodiment, the counter 41 is arranged to issue an output signal when its count reaches 24. This corresponds to a time of about 0.01 second. The output signal is obtained by coupling the "8" and "16" binary stages of the second counter 41 to the first and second inputs of an "AND" gate 46. The output of the "AND" gate 46 extends to the reset terminal 44 of the first counter 33.

The predetermined count of 24 is selected so that if the binary difference number output by the first subtracter 23 equals the binary reference number stored in the reference register 28 for the time required to transport a length of tape 12 past the address head 13 of about two-thirds of the length of a frame of the tape 12, the second counter 41 will not accumulate 24 counts. If these binary numbers are different for a time corresponding to the transport of less than about one-third of a frame past the address head 13, the second counter 41 will be reset to zero by the zero binary difference number signal level output by the second subtracter 27 before the second counter 41 reaches a count of 24. A predetermined count corresponding to a binary reference number and binary difference number match for a time equivalent to transporting a length of tape 12 past the address head 13 of about two-thirds the length of a frame assures the tape 12 will be properly framed relative to the studio synchronizing signal when the control of the transport mechanism 17 is released to internal control. However, as long as the predetermined count of counter 41 is set to correspond to a time equivalent to less than one-half and the predetermined count of counter 33 is set to correspond to a time equivalent to greater than two times the number of pulses provided for each frame, proper framing should be assured.

In operation, as long as the condition hasn't occurred, the second subtracter 27 issues the inhibiting signal to the "AND" gate 36. This prevents clock pulses from being coupled to the clock input terminal 34 of the first counter 33. When the condition does occur, the second subtracter 27 enables the "AND" gate 36 to couple clock pulses to the first counter 33 and, also, resets the second counter 41 to zero. As discussed hereinbefore, while the binary state of the second subtracter 27 is zero, the count of the first counter 33 will be advanced one number by each clock pulse received from the address decoder 27. However, if after the occurrence of the condition, the second subtracter 41 is placed in a binary state other than zero, the "AND" gate 36 is inhibited and the second binary counter 41 enabled to accumulate counts in response to the input clock pulses received from the address decoder. If the tape 12 is being advanced at a speed significantly different from the intended transduction speed or if the particular frame is not properly positioned relative to the studio synchronizing signal, the second subtracter 41 will remain in a binary state other than zero for a time sufficient for the count in the second counter 41 to reach 24. As previously described, when the count of the second counter 41 reaches 24, it causes the "AND" gate 46 to output a signal which resets the first counter 33 to zero. However, if the speed of tape 12 is close to the intended transduction speed when the condition occurs and the particular frame of the tape 12 is within about two-thirds of a frame of being properly positioned relative to the studio synchronizing signal, the second counter 41 will not accumulate a count of 24 while the binary numbers in the reference register 28 and first subtracter 23 are different. Hence, while the accumulation of counts in first counter 33 will be interrupted during the short interval that these binary numbers are different, the accumulated count in counter 33 will be retained since a reset output signal will not be issued by the "AND" gate 46. Consequently, as long as the particular frame is within a distance of one-third of the length of a frame of being properly positioned and the tape 12 is being transported at approximately the intended transduction speed, the condition will last for the required duration, though it will be spread over up to about five interrupted intervals.

Thus, it will be appreciated that the second counter 41 functions to protect against the possibility of a false indication of the occurrence of the condition determinative of the event of interest, hence, against an incorrect indication the event being detected has occurred. It should be further appreciated that the particular numbers of counts in the counters 33 and 41 selected to determine the occurrence of a condition of a desired duration are merely illustrative of a particular use of the event detector 11 of the present invention and that other predetermined counts can be selected in accordance with the particular characteristics of an event being detected.

In the particular application of the event detector 11 of the present invention, the "AND" gate 39 providing the signal indicative of the occurrence of the event being detected has its output coupled to one input of a flip-flop 45. The flip-flop 45 is conditioned by the event occurrence signal to be set in a state which provides an activating current to the coil windings 47 of a relay 48. When the count of the first counter 33 reached the number 224 indicative of the occurrence of the event, the coil windings 47 are excited to cause the arm 49 of the relay 48 to move from the input terminal 18 and make contact with the terminal 51. This couples the motor drive amplifier 19 and transport motor 21 into the transport mechanism's internal servo loop, generally, including a tachometer 52 and transport servo 53 operatively associated with a tachometer disc 54 coupled to be driven synchronously with the transport of the tape 12 by the transport motor 21. When the transport mechanism 17 is switched to internal control, the standard transport servo 53 of the tape transport mechanism 17 performs the final synchronization to ready the magnetic tape recorder/reproducer system to perform the desired transduction operations with tape 12. To set the flip-flop 45 in its other state prior to performing the event detection and, thereby, couple the transport mechanism 17 to receive external drive signal from the input terminal 18, a start command is coupled to the other input 56 of the flip-flop 45.

What is claimed is:

1. Apparatus for controlling the transport of an object to be positioned at a certain location at a predetermined instant, the combination comprising:

means responsive to the transport of the object to provide a signal representative of the actual distance the object must be transported to position it at the certain location;

a source of reference signals providing a reference signal indicative of distance which decreases at a known rate;

comparison means responsive to the reference signal and actual distance representative signal to provide an enabling signal when both the reference signal and actual length representative signal represent the same distance and an inhibiting signal when the signals represent different distances;

a first counter coupled to be enabled to count in response to the enabling signal and to issue an output signal when its count progresses to a predetermined count; and a second counter, said second counter coupled to be enabled to count in response to the inhibiting signal and to be reset in response to the enabling signal, said second counter coupled to issue a reset signal when its count progresses to a predetermined count, and said first counter coupled to be reset by the reset signal.

2. The apparatus according to claim 1 wherein a record medium for storing information at identifiable locations is transported to position a particular location at the certain location at the predetermined instant; the distance representative signal provided by the transport response means represents the actual length of the record medium that must be transported to position its particular location at the certain location; the reference signal provided by the reference signal source is indicative of record medium length; and the comparison means provides enabling and disabling signals according to the lengths represented by the compared signals.

3. The apparatus according to claim 2 further including means providing pulses the number of which represent the length of transported record medium, the first and second counters each coupled to count the pulses when enabled by the comparison means.

4. The apparatus according to claim 3 wherein the record medium is a magnetic record medium having a plurality of discrete storage locations; the actual length representative signal provided by the transport responsive means is in number of discrete storage locations; the reference signal provided by the reference signal source is in number of discrete storage locations; the predetermined count of the second counter is less than the predetermined count of the first counter and is selected relative to the number of pulses provided per unit length of transported magnetic record medium to be less than one-half the number of pulses provided for each discrete storage location.

5. The apparatus according to claim 4 wherein the predetermined count of the first counter is selected relative to the number of pulses provided per unit length of transported magnetic record medium to be more than two times the number of pulses provided for each discrete storage location.

6. The apparatus according to claim 5 wherein the predetermined count of the second counter is equal to about one-third the number of pulses provided for each discrete storage location, and the predetermined count of the first counter is equal to about three times the number of pulses provided for each discrete storage location.

7. The apparatus according to claim 5 wherein the magnetic record medium is a magnetic video tape with each of its successive frames identified by consecutive ones of a sequence of address signals recorded along the tape at a known clock rate, the address signals are reproduced and detected to provide the actual length representative signal, and the pulses provided per unit length of transported tape are at reproduced clock rate.

8. The apparatus according to claim 7, wherein the reference signal is decreased at a rate equal to the rate of transport of the magnetic video tape when transported at transduction speed.

* * * * *